United States Patent
Okumura

(10) Patent No.: US 8,767,364 B2
(45) Date of Patent: Jul. 1, 2014

(54) VEHICLE STEERING SYSTEM

(75) Inventor: Shigekazu Okumura, Sakurai (JP)

(73) Assignee: JTEKT Corporation, Osaka (JP)

( * ) Notice: Subject to any disclaimer, the term of this patent is extended or adjusted under 35 U.S.C. 154(b) by 179 days.

(21) Appl. No.: 13/523,113

(22) Filed: Jun. 14, 2012

(65) Prior Publication Data

US 2013/0003232 A1 Jan. 3, 2013

(30) Foreign Application Priority Data

Jun. 30, 2011 (JP) ................................. 2011-145990

(51) Int. Cl.
*H02H 3/00* (2006.01)

(52) U.S. Cl.
USPC ............ 361/78; 361/88; 361/97; 318/400.06; 318/601; 318/400.07; 318/533; 318/566

(58) Field of Classification Search
CPC .......... H03K 17/0822; H03K 19/0948; H03K 17/0826; H03K 17/284; H03K 17/18; H03K 3/26; G01R 31/025; G01R 31/327; G01R 19/16528; G01R 31/024; G01R 31/40; H02M 1/32; H02M 3/156; H02M 7/5387; H02M 2001/009; H02M 7/53871; H02M 1/36; H02M 3/158
USPC ............... 318/400.06, 601, 599, 400.07, 563, 318/566; 361/32, 86, 88, 78, 18, 3
See application file for complete search history.

(56) References Cited

U.S. PATENT DOCUMENTS

| | | | | |
|---|---|---|---|---|
| 7,199,589 B2 * | 4/2007 | Galvano et al. | ................ | 324/521 |
| 7,471,003 B2 * | 12/2008 | Kobayashi et al. | ......... | 290/40 C |
| 7,528,569 B2 * | 5/2009 | Hidaka et al. | ................. | 318/801 |
| 8,232,752 B2 * | 7/2012 | Kezobo et al. | ........... | 318/400.06 |
| 8,264,190 B2 * | 9/2012 | Suzuki | ......................... | 318/724 |
| 8,633,664 B2 * | 1/2014 | Endoh | ..................... | 318/400.22 |
| 2009/0251831 A1 | 10/2009 | Shiba et al. | | |

FOREIGN PATENT DOCUMENTS

| | | |
|---|---|---|
| JP | A-2006-311633 | 11/2006 |
| JP | A-2008-011683 | 1/2008 |

OTHER PUBLICATIONS

European Search Report dated Mar. 11, 2014 issued in European Patent Application No. 12173351.3.

* cited by examiner

*Primary Examiner* — Rita Leykin
(74) *Attorney, Agent, or Firm* — Oliff PLC

(57) ABSTRACT

When a short-circuited FET is identified as one of low-side FETs, maximum phase voltages of three phases are detected when a steering operation is performed by a driver, and the detected maximum phase voltages of the three phases are compared with one another to identify a short-circuit phase. On the other hand, when a short-circuited FET is identified as one of high-side FETs, minimum phase voltages of the three phases are detected when a steering operation is performed by the driver, and the detected minimum phase voltages of the three phases are compared with one another to identify a short-circuit phase.

3 Claims, 12 Drawing Sheets

A : Allowable
N/A : Non-allowable
Ind : Indeterminate

| SHORT-CIRCUITED FET | | ELECTRIC ANGLE | 0 | 30 | 60 | 90 | 120 | 150 | 180 | 210 | 240 | 270 | 300 | 330 | 360 |
|---|---|---|---|---|---|---|---|---|---|---|---|---|---|---|---|
| CW | U | LOWER | Ind(V) | | A(V) | | A(W) | | Ind(W) | | A(V) | N/A | | | Ind(V) |
| | V | LOWER | | N/A | | | Ind(W) | | A(W) | | A(U) | | Ind(U) | N/A | |
| | W | LOWER | A(V) | | Ind(V) | | | N/A | | | Ind(U) | | A(U) | | A(V) |
| CCW | U | UPPER | Ind(W) | | A(U) | N/A | Ind(U) | | Ind(V) | | A(V) | | A(W) | | Ind(W) |
| | V | UPPER | A(W) | | Ind(U) | | A(U) | | | N/A | | | Ind(W) | | A(W) |
| | W | UPPER | N/A | | | | A(U) | | A(V) | | Ind(V) | | | N/A | |
| CW | U | LOWER | Ind(W) | | A(V) | N/A | A(W) | | Ind(V) | N/A | A(V) | N/A | A(W) | | Ind(W) |
| | V | LOWER | | N/A | | | Ind(W) | | A(W) | | | | Ind(W) | | A(W) |
| | W | LOWER | | | Ind(U) | | A(U) | | Ind(W) | | Ind(U) | | Ind(U) | N/A | |
| CCW | U | UPPER | Ind(V) | | A(V) | | | N/A | | | A(V) | | Ind(U) | | Ind(V) |
| | V | UPPER | | N/A | | | Ind(U) | | | | Ind(U) | | | N/A | |
| | W | UPPER | A(V) | | Ind(V) | | A(U) | | A(V) | | | | A(V) | | A(V) |

Fig. 6

| | |
|---|---|
| e1 | U-PHASE PEAK VALUE CANDIDATE $V_{UP}$ |
| e2 | ROTOR ROTATION ANGLE $\theta_U$ WHEN U-PHASE PEAK VALUE IS DETECTED |
| e3 | V-PHASE PEAK VALUE CANDIDATE $V_{VP}$ |
| e4 | ROTOR ROTATION ANGLE $\theta_V$ WHEN V-PHASE PEAK VALUE IS DETECTED |
| e5 | W-PHASE PEAK VALUE CANDIDATE $V_{WP}$ |
| e6 | ROTOR ROTATION ANGLE $\theta_W$ WHEN W-PHASE PEAK VALUE IS DETECTED |

Fig. 10

VEHICLE STEERING SYSTEM

INCORPORATION BY REFERENCE/RELATED APPLICATION

This application claims priority to Japanese Patent Application No. 2011-145990 filed on Jun. 30, 2011 the disclosure of which, including the specification, drawings and abstract, is incorporated herein by reference in its entirety.

BACKGROUND OF THE INVENTION

1. Field of the Invention

The invention relates to a vehicle steering system that includes a motor control device for driving a three-phase brushless motor.

2. Discussion of Background

A drive circuit for a brushless motor used in an electric power steering system includes switching elements, such as field effect transistors (FETs). If a fault occurs in one of the switching elements, there is a possibility that the brushless motor becomes a load when a steering wheel is operated and, as a result, steering operation becomes heavy. In order to cope with such a problem, relays are provided on connecting lines between the brushless motor and the drive circuit. For example, US2009/0251831 A1 describes that relays are provided on respective motor connecting lines for two phases of a three-phase brushless motor and those relays are turned off when the motor is not controlled or when a fault occurs in one of switching elements.

However, with the technique described in US2009/0251831 A1, it is not possible to identify a short-circuited switching element.

SUMMARY OF THE INVENTION

The invention provides a vehicle steering system that is able to, when a short-circuit fault occurs in one of switching elements in a drive circuit for a three-phase brushless motor, identify the short-circuited switching element.

According to a feature of an example of the invention, driving of a three-phase brushless motor is stopped when a short-circuit fault occurs in one of a plurality of switching elements. First identifying means identifies whether the short-circuited switching element is one of high-side switching elements or one of low-side switching elements. When the short-circuited switching element is identified as one of the high-side switching elements by the first identifying means, second identifying means identifies to which of the three phases the short-circuited switching element corresponds. Specifically, minimum phase voltages of the three phases are detected when a steering member for steering a vehicle is operated, and the detected minimum phase voltages of the three phases are compared with one another to thereby identify to which of the three phases the short-circuited switching element corresponds. On the other hand, when the short-circuited switching element is identified as one of the low-side switching elements by the first identifying means, third identifying means identifies to which of the three phases the short-circuited switching element corresponds. Specifically, maximum phase voltages of the three phases are detected when the steering member for steering the vehicle is operated, and the detected maximum phase voltages of the three phases are compared with one another to thereby identify to which of the three phases the short-circuited switching element corresponds. Thus, it is possible to identify the short-circuited switching element.

According to another feature of an example of the invention, the second identifying means includes minimum erroneous detection check means, and the third identifying means includes the maximum erroneous detection check means. The minimum erroneous detection check means determines whether there is an erroneously detected minimum phase voltage based on three rotor rotation angles at which the minimum phase voltages of the respective three phases are detected. When it is determined that there is an erroneously detected minimum phase voltage, the minimum erroneous detection check means executes a process for detecting minimum phase voltages of the three phases again. The maximum erroneous detection check means determines whether there is an erroneously detected maximum phase voltage based on three rotor rotation angles at which the maximum phase voltages of the respective three phases are detected. When it is determined that there is an erroneously detected maximum phase voltage, the maximum erroneous detection check means executes a process for detecting maximum phase voltages of the three phases again.

According to a further feature of an example of the invention, the minimum erroneous detection check means is configured to determine that there is an erroneously detected minimum phase voltage if, among all combinations each of which is formed of two rotor rotation angles selected from the three rotor rotation angles at which the minimum phase voltages of the respective phases are detected, there is a combination formed of two rotor rotation angles having a difference of which an absolute value is smaller than or equal to a predetermined value, and the maximum erroneous detection check means is configured to determine that there is an erroneously detected maximum phase voltage if, among all combinations each of which is formed of two rotor rotation angles selected from the three rotor rotation angles at which the maximum phase voltages of the respective phases are detected, there is a combination formed of two rotor rotation angles having a difference of which an absolute value is smaller than or equal to a predetermined value.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein:

FIG. 6 is a table showing a map that shows an "allowable range", "an indeterminate range" and a "non-allowable range", corresponding to each of combinations of a direction in which an electric motor should be rotated and a short-circuited FET;

FIG. 10 is a schematic view that shows part of the contents of a memory; and

DETAILED DESCRIPTION OF EMBODIMENTS

Hereinafter, an embodiment of the invention will be described with reference to the accompanying drawings.

Figure 1:
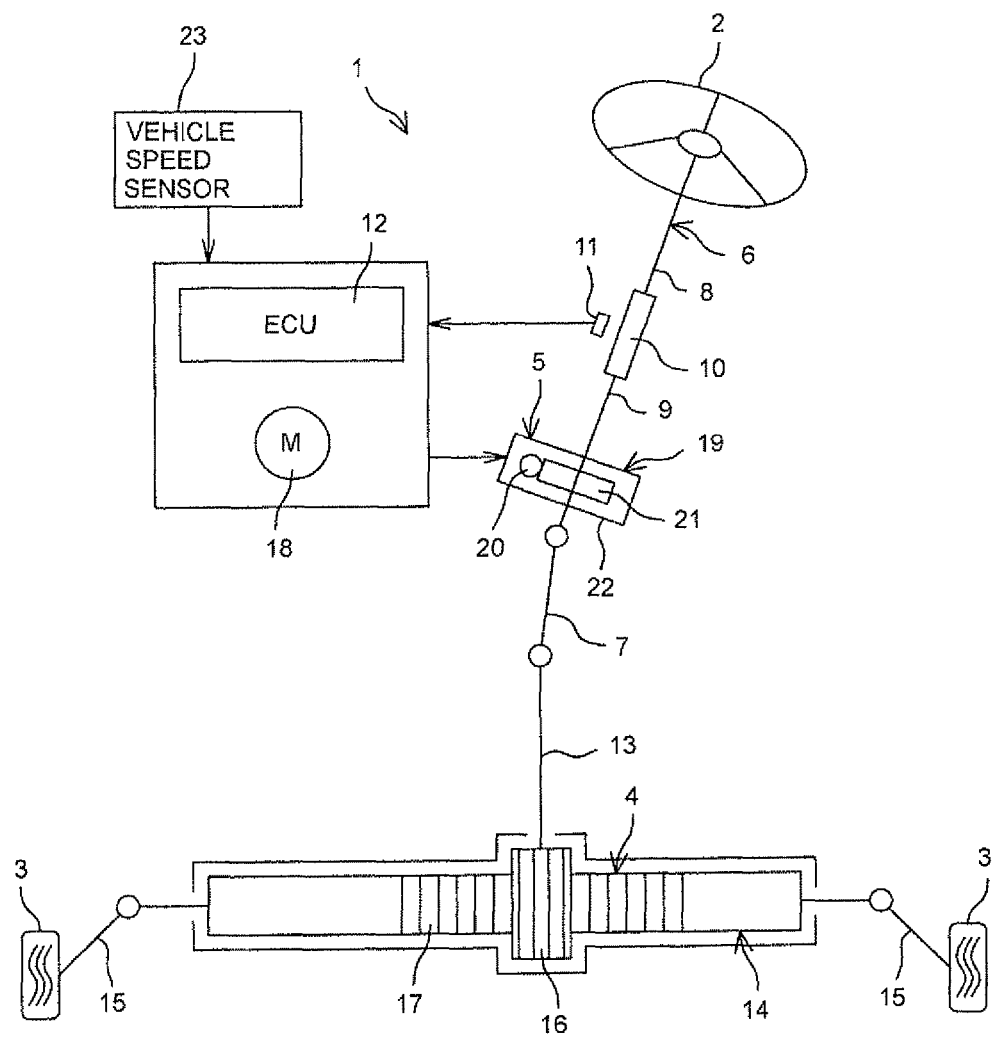
FIG. 1 is a view that schematically shows the configuration of an electric power steering system that serves as a vehicle steering system according to an embodiment of the invention.

FIG. 1 is a view that schematically shows the configuration of an electric power steering system that serves as a vehicle steering system according to the embodiment of the invention. The electric power steering system 1 includes a steering wheel 2, a steering mechanism 4, and a steering assist mechanism 5. The steering wheel 2 serves as a steering member for steering a vehicle. The steering mechanism 4 steers steered wheels 3 in accordance with the rotation of the steering wheel 2. The steering assist mechanism 5 is used to assist a driver in performing a steering operation. The steering wheel 2 is mechanically coupled to the steering mechanism 4 via a steering shaft 6 and an intermediate shaft 7.

The steering shaft 6 includes an input shaft 8 and an output shaft 9. The input shaft 8 is coupled to the steering wheel 2. The output shaft 9 is coupled to the intermediate shaft 7. The input shaft 8 and the output shaft 9 are coupled to each other via a torsion bar 10 so as to be rotatable relative to each other. A torque sensor 11 is arranged near the steering shaft 6. The torque sensor 11 detects a steering torque applied to the steering wheel 2 on the basis of the amount of relative rotational displacement between the input shaft 8 and the output shaft 9. The steering torque detected by the torque sensor 11 is input into an electronic control unit (ECU) 12. In addition, a vehicle speed detected by a vehicle speed sensor 23 is input into the ECU 12.

The steering mechanism 4 is formed of a rack and pinion mechanism that includes a pinion shaft 13 and a rack shaft 14 that serves as a steered shaft. The steered wheels 3 are coupled to the respective end portions of the rack shaft 14 via tie rods 15 and knuckle arms (not shown). The pinion shaft 13 is coupled to the intermediate shaft 7. The pinion shaft 13 rotates in accordance with a steering operation of the steering wheel 2. A pinion 16 is coupled to one end (lower end in FIG. 1) of the pinion shaft 13.

The rack shaft 14 extends linearly in the lateral direction (direction perpendicular to the straight-ahead direction) of a vehicle. A rack 17 is formed in the rack shaft 14 at a middle portion in the axial direction. The rack 17 is in mesh with the pinion 16. The pinion 16 and the rack 17 convert the rotation of the pinion shaft 13 into a movement of the rack shaft 14 in the axial direction. By moving the rack shaft 14 in the axial direction, the steered wheels 3 are steered.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 to a movement of the rack shaft 14 in the axial direction. Thus, the steered wheels 3 are steered.

The steering assist mechanism 5 includes an electric motor 18 for steering assist and a speed reduction mechanism 19 that is used to transmit the torque output from the electric motor 18 to the steering mechanism 4. In the present embodiment, the electric motor 18 is formed of a three-phase brushless motor. The speed reduction mechanism 19 is formed of a worm gear mechanism that includes a worm shaft 20 and a worm wheel 21 that is in mesh with the worm shaft 20. The speed reduction mechanism 19 is accommodated in a gear housing 22 that serves as a transmission mechanism housing.

The worm shaft 20 is rotated by the electric motor 18. The worm wheel 21 is coupled to the steering shaft 6 so as to be rotatable in the same direction as the rotation direction of the steering shaft 6. The worm wheel 21 is rotated by the worm shaft 20.

When the worm shaft 20 is rotated by the electric motor 18, the worm wheel 21 is rotated and then the steering shaft 6 rotates. Then, the rotation of the steering shaft 6 is transmitted to the pinion shaft 13 via the intermediate shaft 7. The rotation of the pinion shaft 13 is converted into a movement of the rack shaft 14 in the axial direction. Thus, the steered wheels 3 are steered. That is, as the worm shaft 2 is rotated by the electric motor 18, the steered wheels 3 are steered.

The electric motor 18 is controlled by the ECU 12 that serves as a motor control device. The ECU 12 controls the electric motor 18 on the basis of the steering torque detected by the torque sensor 11, the vehicle speed detected by the vehicle speed sensor 23, and the like. Specifically, the ECU 12 determines a target assist amount using a map that stores the correlation between a steering torque and a target assist amount for each vehicle speed, and then executes control such that assist force generated by the electric motor 18 approaches the target assist amount.

Figure 2:
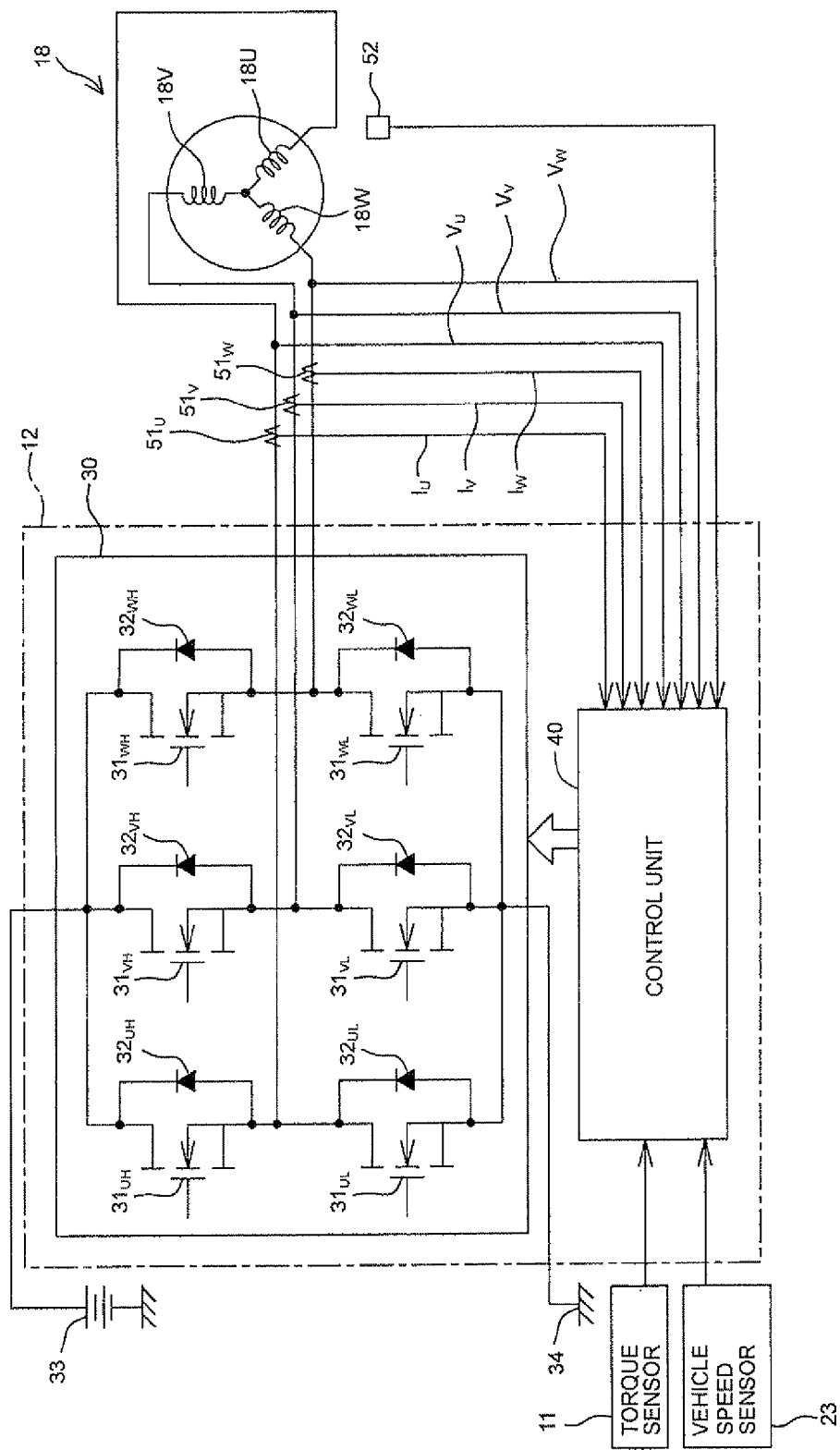
FIG. 2 is a block diagram that shows the electrical configuration of an electronic control unit (ECU) that serves as a motor control device.

FIG. 2 is a schematic diagram that shows the electrical configuration of the ECU 12 that serves as the motor control device. The electric motor 18 includes a stator and a rotor. The stator has a U-phase field coil 18U, a V-phase field coil 18V and a W-phase field coil 18W. A permanent magnet is fixed to the rotor.

The ECU 12 includes a drive circuit 30 and a control unit 40. The drive circuit 30 generates electric power for driving the electric motor 18. The control unit 40 is used to control the drive circuit 30. The control unit 40 is formed of a microcomputer that includes a CPU and a memory (ROM, RAM, nonvolatile memory, or the like) that stores, for example, operation programs for the CPU.

The drive circuit 30 is a three-phase bridge inverter circuit. In the drive circuit 30, a series circuit formed of a pair of field effect transistors (FETs) $31_{UH}$ and $31_{UL}$ that correspond to the U phase of the electric motor 18, a series circuit formed of a pair of FETs $31_{VH}$ and $31_{VL}$ that correspond to the V phase of the electric motor 18 and a series circuit formed of a pair of FETs $31_{WH}$ and $31_{WL}$ that correspond to the W phase of the electric motor 18 are connected in parallel with one another between a direct-current power supply 33 and a ground 34. In addition, regenerative diodes $32_{UH}$ to $32_{WL}$ are connected in parallel with the FETs $31_{UH}$ to $31_{WL}$, respectively, in such an orientation that forward current flows from the ground 34-side toward the direct-current power supply 33.

In the following description, the power supply-side FET of the pair of FETs of each phase will be referred to as "high-side FET" or "upper FET" and the ground-side FET will be referred to as "low-side FET" or "lower FET" where appropriate. In addition, the six FETs $31_{UH}$ to $31_{WL}$ will be collectively referred to as "FETs 31". Similarly, the six regenerative diodes $32_{UH}$ to $32_{WL}$ will be collectively referred to as "regenerative diodes 32".

The U-phase field coil 18U of the electric motor 18 is connected to a connecting point between the pair of FETs $31_{UH}$ and $31_{UL}$ that correspond to the U phase. The V-phase field coil 18V of the electric motor 18 is connected to a connecting point between the pair of FETs $31_{VH}$ and $31_{VL}$ that correspond to the V phase. The W-phase field coil 18W of the electric motor 18 is connected to a connecting point between the pair of FETs $31_{WH}$ and $31_{WL}$ that correspond to the W phase. Current sensors $51_U$, $51_V$ and $51_W$ are respectively provided on connecting lines that connect the field coils 18U, 18V and 18W of the respective phases to the drive circuit 30. The current sensors $51_U$, $51_V$ and $51_W$ are used to detect phase currents $I_U$, $I_V$ and $I_W$ of the respective phases. A rotation angle sensor 52, such as a resolver, is provided on the electric motor 18-side. The rotation angle sensor 52 is used to detect the rotation angle (electric angle) of the rotor.

The rotor rotation angle (electric angle) detected by the rotation angle sensor 54, the steering torque detected by the torque sensor 11, the vehicle speed detected by the vehicle speed sensor 23, the phase currents $I_U$, $I_V$ and $I_W$ of the respective phases, detected by the current sensors $51_U$, $51_V$ and $51_W$, and the phase voltages $V_U$, $V_V$ and $V_W$ of the respective phases, detected by phase voltage detection circuits (not shown), are input into the control unit 40.

Figure 3:
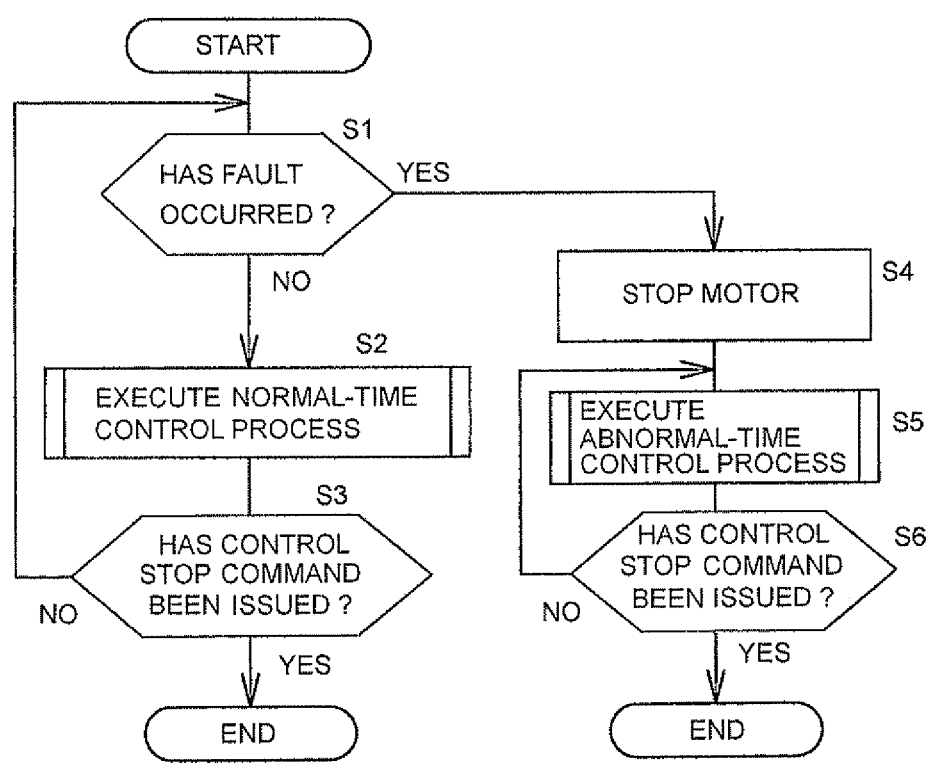
FIG. 3 is a flowchart that shows the overall operation of a control unit.

FIG. 3 is a flowchart that shows the overall operation of the control unit 40. The control unit 40 monitors whether a fault has occurred in any one of the FETs 31 (step S1). When no fault has occurred in the FETs 31 (NO in step S1), the control unit executes normal-time control process (step S2). That is, the control unit 40 controls the FETs 31 to drive the electric motor 18 in the 180° sinusoidal wave energization drive mode.

Specifically, the control unit 40 determines a target assist amount on the basis of, for example, the map that stores the correlation between a steering torque and a target assist amount (target current value) for each vehicle speed, the steering torque detected by the torque sensor 11 and the vehicle speed detected by the vehicle speed sensor 23. Then, the control unit 40 executes pulse width modulation (PWM) control over the FETs 31 such that the assist force (torque) generated by the electric motor 18 approaches the target assist amount on the basis of the target assist amount, the phase currents $I_U$, $I_V$ and $I_W$ of the respective phases, detected by the current sensors $51_U$, $51_V$ and $51_W$, and the rotor rotation angle (electric angle) detected by the rotation angle sensor 52.

When a control stop command, such as a power-off command, is input in the control unit 40 while the normal-time control process is being executed (YES in step S3), the control unit 40 ends the normal-time control process. When a fault occurs in one of the FETs 31 while the normal-time control process in step S2 is being executed (YES in step S1), the control unit 40 turns off all the FETs 31 to temporarily stop driving of the electric motor 18 (step S4). Then, the control unit 40 executes abnormal-time control process (step S5). When a control stop command is input in the control unit 40 while the abnormal-time control process is being executed (YES in step S6), the control unit 40 ends the abnormal-time control process.

The abnormal-time control process includes a process of identifying a short-circuited FET when a short-circuit fault has occurred in one of the FETs 31 (at the time of a short-circuit fault), a process of identifying a controllable range at the time of a short-circuit fault, a process of executing drive control over the motor in the controllable range at the time of a short-circuit fault, and the like. The controllable range means a rotor rotation angle range (electric angle range) in which the electric motor 18 is able to be driven in a direction in which the electric motor 18 should be rotated at the time of a short-circuit fault.

The process of identifying the controllable range will be described before the overall operation of the abnormal-time control process is described. In the following description, the phase that includes the one FET that is short-circuited is referred to as a short-circuit phase, and the other phases that do not include the one FET that is short-circuited are referred to as normal phases where appropriate. When a short-circuit fault occurs in one of the six FETs $31_{UH}$ to $31_{WL}$, load current flows through closed circuits that are formed of the short-circuited FET and the regenerative diodes connected in parallel with the respective normal FETs when the rotor is rotated with all the FETs other than the short-circuited FET turned off, depending on the rotor rotation angle (electric angle). In the present embodiment, the control unit 40 identifies an electric angle range, in which load current does not flow through either of the two normal phases, as an "allowable range", identifies an electric angle range, in which load current flows through only one of the two normal phases, as an "indeterminate range", and identifies an electric angle range, in which load current flows through both of the two normal phases, as a "non-allowable range".

In the present embodiment, a range that is formed by combining the "allowable range" with the "indeterminate range" is identified as a controllable range in which the electric motor 18 is able to be driven at the time of a short-circuit fault, and the "non-allowable range" is identified as an uncontrollable range in which the electric motor 18 is not able to be driven at the time of a short-circuit fault. Note that only the "allowable range" may be identified as the controllable range and a range that is formed by combining the "indeterminate range" with the "non-allowable range" may be identified as the uncontrollable range.

Figure 4:
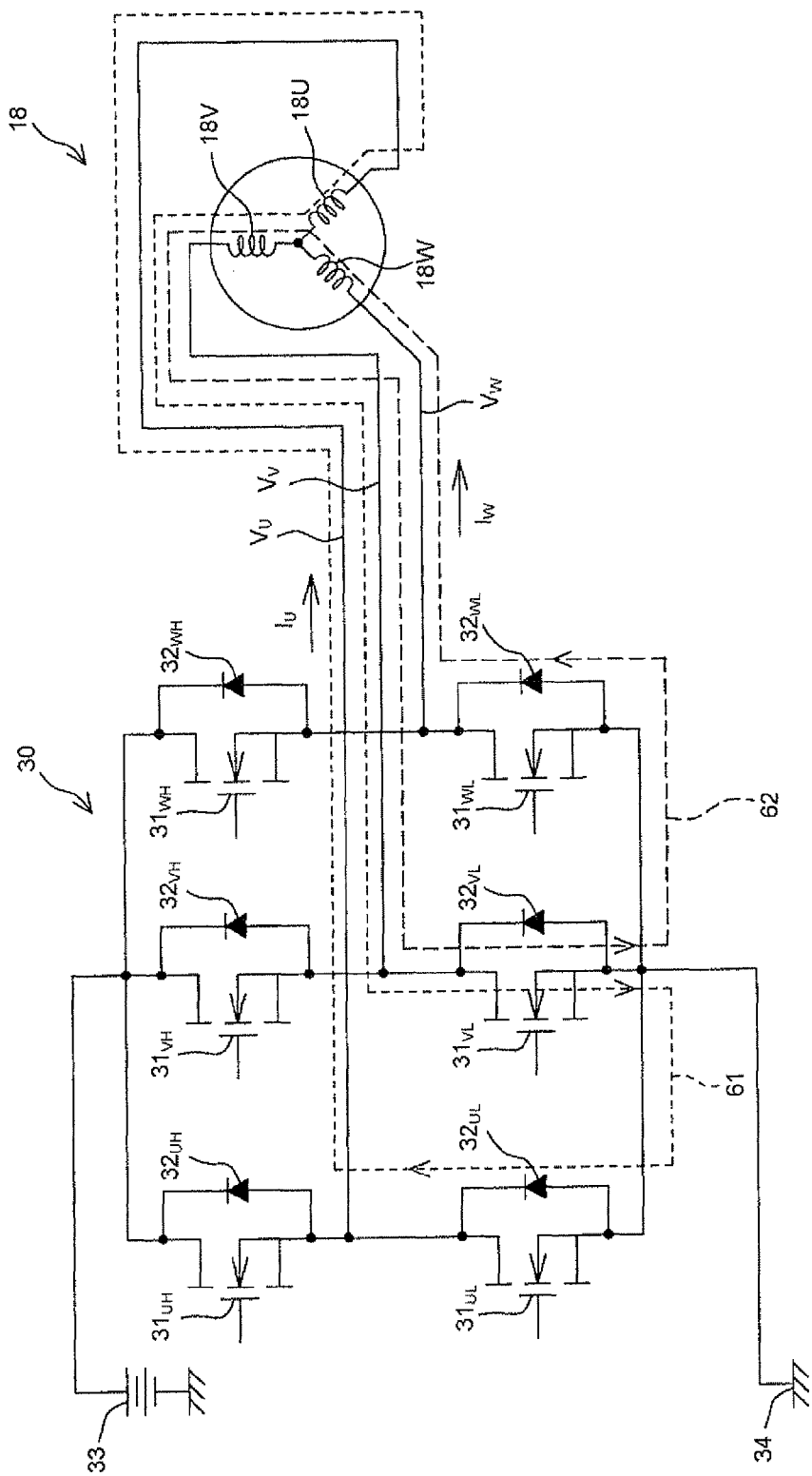
FIG. 4 is an electrical circuit diagram that shows closed circuits through which load current flows when a short-circuit fault occurs in one of low-side FETs.

As shown in FIG. 4, for example, it is assumed that, when a short-circuit fault occurs in the V-phase low-side FET $31_{VL}$, the rotor is rotated through a driver's steering operation with all the other FETs turned off. In this case, induced voltage is generated in the electric motor 18. The induced voltage causes load current to flow in the direction indicated by arrows in one or both of a first closed circuit indicated by a reference numeral 61 and a second closed circuit indicated by a reference numeral 62, depending on a rotor rotation angle (electric angle).

The first closed circuit 61 includes the short-circuited V-phase low-side FET $31_{VL}$, the regenerative diode $32_{UL}$, the U-phase field coil 18U and the V-phase field coil 18V. The regenerative diode $32_{UL}$ is connected in parallel with the normal U-phase low-side FET $31_{UL}$. The second closed circuit 62 includes the short-circuited V-phase low-side FET $31_{VL}$, the regenerative diode $32_{WL}$, the W-phase field coil 18W and the V-phase field coil 18V. The regenerative diode $32_{WL}$ is connected in parallel with the normal W-phase low-side FET $31_{WL}$.

Therefore, when a short-circuit fault occurs in the V-phase low-side FET $31_{VL}$, the "non-allowable range", the "allowable range" and the "indeterminate range" are as follows. That is, an electric angle range in which load current flows through both the first closed circuit 61 and the second closed circuit 62 is the "non-allowable range". On the other hand, an electric angle range in which load current does not flow through either the first closed circuit 61 or the second closed circuit 62 is the "allowable range". An electric angle range in which load current flows through only one of the first closed circuit 61 and the second closed circuit 62 is the "indeterminate range".

Figure 5:
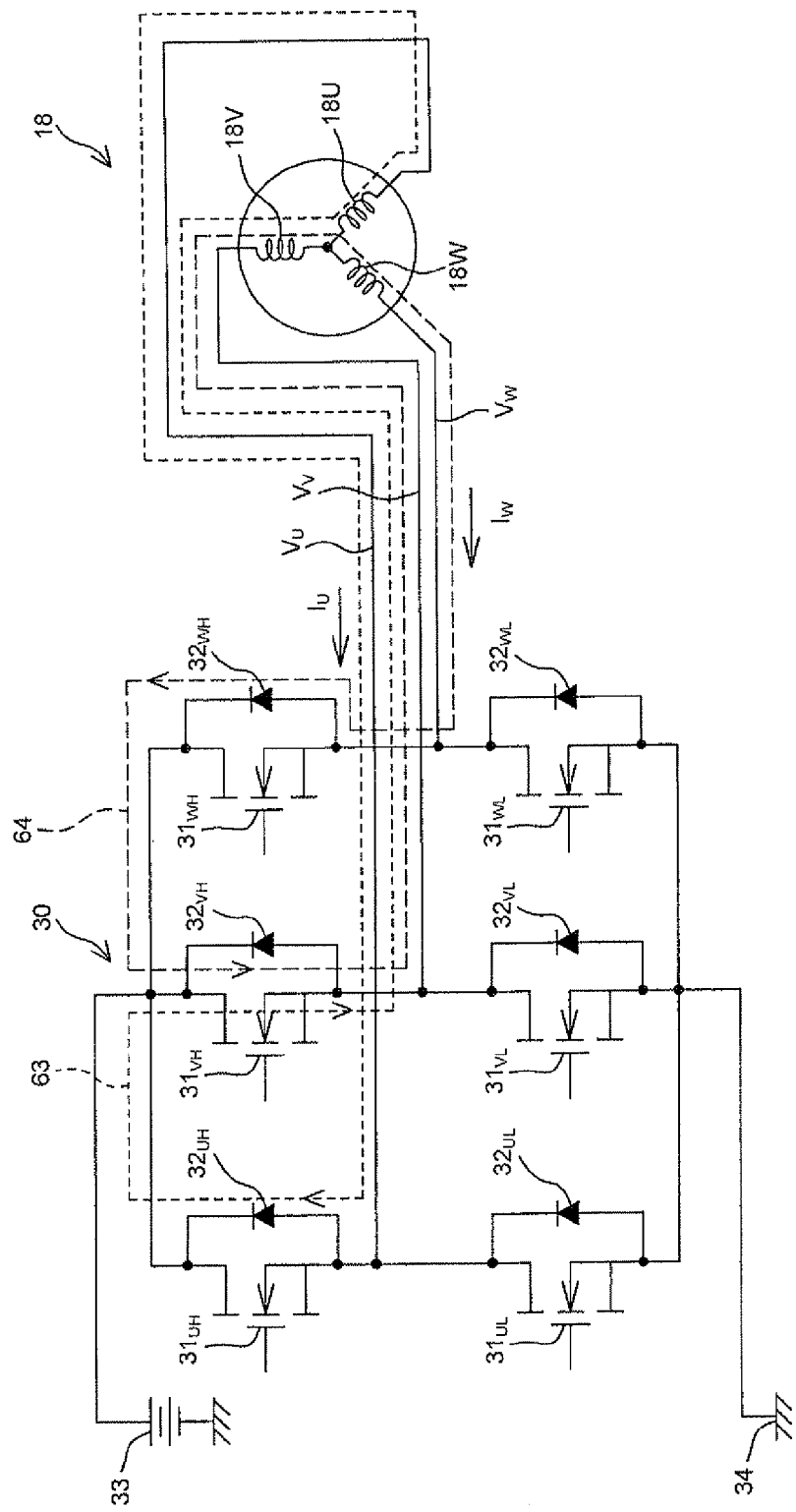
FIG. 5 is an electrical circuit diagram that shows closed circuits through which load current flows when a short-circuit fault occurs in one of high-side FETs.

On the other hand, as shown in FIG. 5, it is assumed that, when a short-circuit fault occurs in the V-phase high-side FET $31_{VH}$, the rotor is rotated through a driver's steering operation with all the other FETs turned off. In this case, induced voltage is generated in the electric motor 18. The induced voltage causes load current to flow in the direction indicated by arrows in one or both of a third closed circuit indicated by a reference numeral 63 and a fourth closed circuit indicated by a reference numeral 64, depending on a rotor rotation angle (electric angle).

The third closed circuit 63 includes the short-circuited V-phase high-side FET $31_{VH}$, the V-phase field coil 18V, the U-phase field coil 18U, and the regenerative diode $32_{UH}$ connected in parallel with the normal U-phase high-side FET $31_{UH}$. The fourth closed circuit 64 includes the short-circuited V-phase high-side FET $31_{VH}$, the V-phase field coil 18V, the W-phase field coil 18W, and the regenerative diode $32_{WH}$ connected in parallel with the normal W-phase high-side FET $31_{WH}$.

Therefore, when a short-circuit fault occurs in the V-phase high-side FET $31_{VH}$, the "non-allowable range", the "allowable range" and the "indeterminate range" are as follows. That is, an electric angle range in which load current flows through both the third closed circuit 63 and the fourth closed circuit 64 is the "non-allowable range". On the other hand, an electric angle range in which load current does not flow through either the third closed circuit 63 or the fourth closed circuit 64 is the "allowable range". An electric angle range in which load current flows through only one of the third closed circuit 63 and the fourth closed circuit 64 is the "indeterminate range".

As shown in FIG. 4, in order to allow load current to flow in the direction indicated by the arrow through the first closed circuit 61 that includes the U-phase field coil 18U when a short-circuit fault has occurred in the V-phase low-side FET $31_{VL}$, the phase voltage $V_V$ of the V phase that is the short-circuit phase needs to be higher (larger) than the phase voltage $V_U$ of the U phase that is the normal phase. In this case, if the polarity of current that flows from the drive circuit 30 toward the electric motor 18 is positive, the polarity of the phase current $I_U$ of the U phase that is the normal phase is positive. Similarly, in order to allow load current to flow in the direction indicated by the arrow through the second closed circuit 62 that includes the W-phase field coil 18W, the phase voltage $V_V$ of the V phase that is the short-circuit phase needs to be higher than the phase voltage $V_W$ of the W phase that is the normal phase. In this case, the polarity of the phase current $I_W$ of the W phase that is the normal phase is positive.

As shown in FIG. 5, in order to allow load current to flow in the direction indicated by the arrow through the third closed circuit 63 that includes the U-phase field coil 18U when a short-circuit fault has occurred in the V-phase high-side FET $31_{VH}$, the phase voltage $V_V$ of the V phase that is the short-circuit phase needs to be lower (smaller) than the phase voltage $V_U$ of the U phase that is the normal phase. In this case, the polarity of the phase current $I_U$ of the U phase that is the normal phase is negative. Similarly, in order to allow load current to flow in the direction indicated by the arrow through the fourth closed circuit 64 that includes the W-phase field coil 18W, the phase voltage $V_V$ of the V phase that is the short-circuit phase needs to be lower than the phase voltage $V_W$ of the W phase that is the normal phase. In this case, the polarity of the phase current $I_W$ of the W phase that is the normal phase is negative.

As described above, the "allowable range", the "indeterminate range" and the "non-allowable range" vary depending on the position of the short-circuited FET. In addition, the induced voltage waveforms of the respective phases are different between the case where the electric motor 18 is rotated in the forward direction and the case where the electric motor 18 is rotated in the reverse direction even when the short-circuited FET is the same. Therefore, the "allowable range", the "indeterminate range" and the "non-allowable range" vary depending on the rotation direction of the electric motor 18.

In the present embodiment, a map that shows the "allowable range", the "indeterminate range" and the "non-allowable range" corresponding to each of combinations of the direction (CW or CCW) in which the electric motor 18 is rotated and the short-circuited FET, is created in advance and is stored in the nonvolatile memory of the control unit 40. FIG. 6 shows an example of the contents of such a map. In FIG. 6, CW (clockwise) and CCW (counterclockwise) each indicate the rotation direction in which the electric motor 18 should be rotated, CW indicates the forward direction and CCW indicates the reverse direction. U, V, W, the upper and the lower indicate the position of the short-circuited FET. That is, U, V and W each indicate a short-circuit phase. The upper indicates that the short-circuited FET is the upper FET (high-side FET), and the lower indicates that the short-circuited FET is the lower FET (low-side FET). Such a map is created on the basis of theoretical values or measured data.

Figure 7:
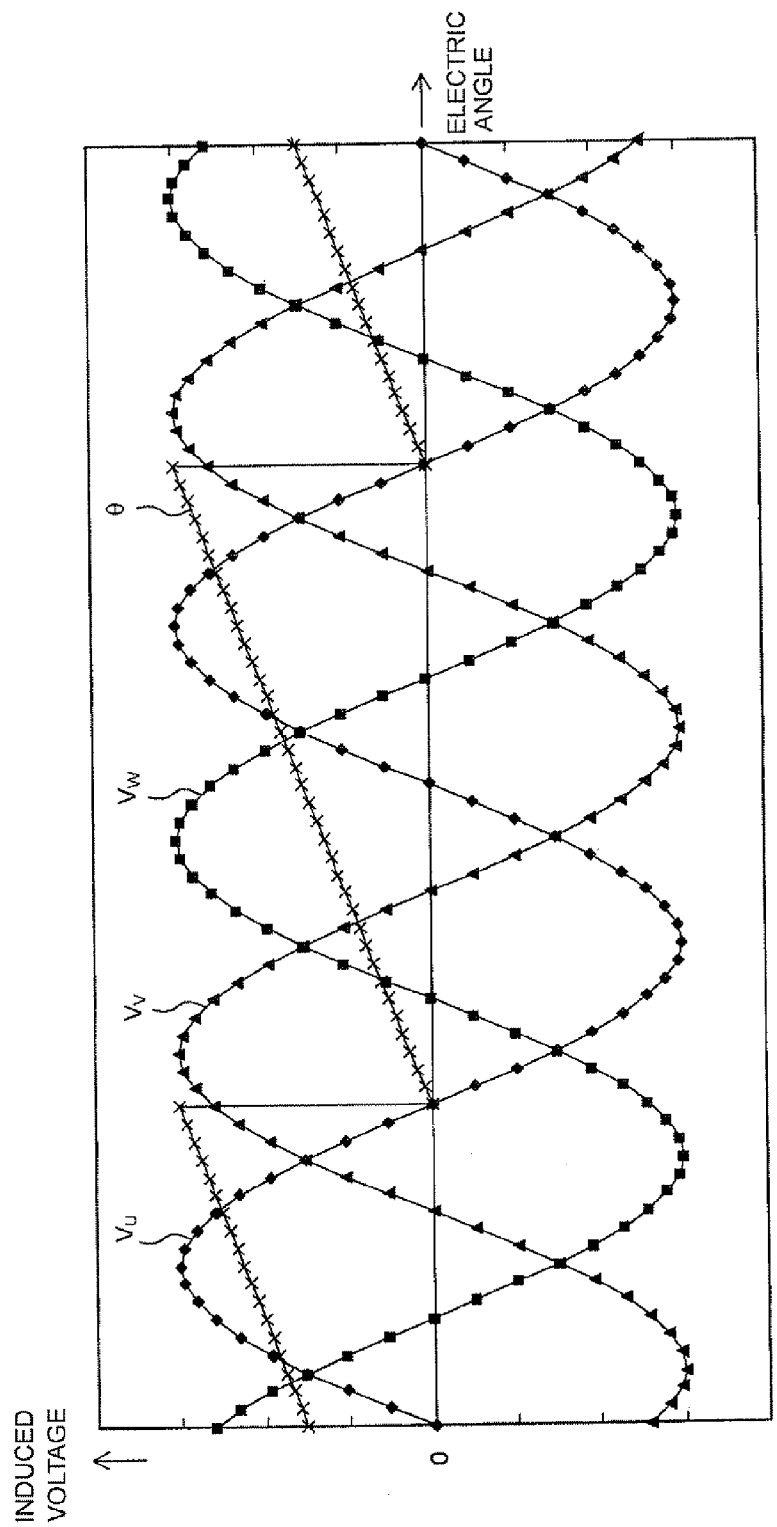
FIG. 7 is a graph that shows theoretical values of respective phase induced voltage waveforms $V_U$, $V_V$ and $V_W$ with respect to a rotor rotation angle θ when a rotor is rotated in a forward direction in a state where all the FETs are turned off when all the FETs are normal.

The case where the map is created on the basis of theoretical values will be described. FIG. 7 is a graph that shows theoretical values (simulation values) of respective phase induced voltage waveforms $V_U$, $V_V$ and $V_W$ with respect to a rotor rotation angle θ when the rotor is rotated in the forward direction in a state where all the FETs 31 are turned off when all the FETs 31 are normal. In this example, the point at which the U-phase induced voltage waveform changes from positive to negative is set as 0° of the rotor rotation angle (electric angle) θ.

The theoretical values $V_U$, $V_V$ and $V_W$ of the respective phase induced voltages are expressed by Equation 1 where the amplitude is E.

$$V_U = E \cdot \sin(\theta - \pi)$$

$$V_V = E \cdot \sin(\theta - \pi - (2/3)\pi)$$

$$V_W = E \cdot \sin(\theta - \pi + (2/3)\pi) \quad \text{Equation 1}$$

Figure 8A:
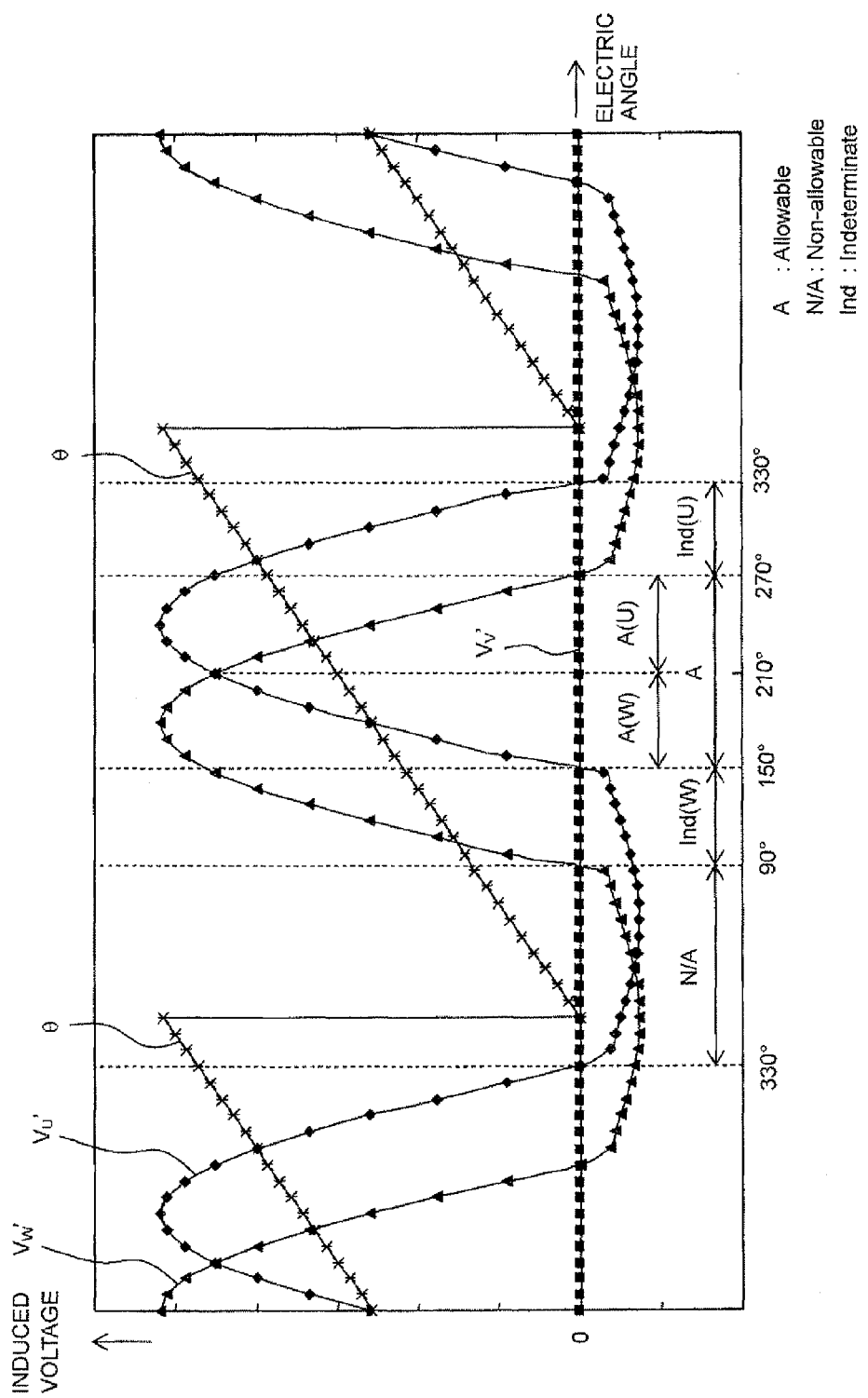
FIG. 8A is a graph that shows theoretical values of respective phase induced voltage waveforms $V_U'$, $V_V'$ and $V_W'$ with respect to a rotor rotation angle θ when the rotor is rotated in the forward direction in a state where all the FETs other than the V-phase low-side FET are turned off when a short-circuit fault occurs in the V-phase low-side FET.

FIG. 8A is a graph that shows theoretical values (simulation values) of respective phase induced voltage waveforms $V_U'$, $V_V'$ and $V_W'$ with respect to a rotor rotation angle θ when the rotor is rotated in the forward direction in a state where all the FETs other than the V-phase low-side FET $31_{VL}$ are turned off when a short-circuit fault occurs in the V-phase low-side FET $31_{VL}$. The theoretical values of the respective phase induced voltages $V_U'$, $V_V'$ and $V_W'$ in the case where a short-circuit fault occurs in the V-phase low-side FET $31_{VL}$ are expressed by Equation 2 using the theoretical values $V_U$, $V_V$ and $V_W$ of the respective induced voltages in the case where all the FETs 31 are normal.

$$V_U' = V_U - V_V$$

$$V_V' = 0$$

$$V_W' = V_W - V_V \quad \text{Equation 2}$$

On the basis of the theoretical values shown in FIG. 8A, the controllable range in the case where the short-circuited FET is the V-phase low-side FET $31_{VL}$ and the direction in which the electric motor 18 should be rotated is the forward direction is identified.

Specifically, an electric angle range in which the induced voltages $V_U'$ and $V_W'$ of respective normal phases (U phase and V phase) are higher than the induced voltage $V_V'$ (0 in the example of FIG. 8A) of the short-circuit phase (V phase) (an electric angle range in which load current does not flow through either the first closed circuit 61 or the second closed circuit 62 in FIG. 4) is identified as the "allowable range". In this example, the "allowable range" is a range of 150° to 270°. Note that, in the present embodiment, in the case where the short-circuited FET is the low-side FET, if the two normal phases are denoted by A and B, an electric angle range in which the phase voltage of one normal phase A is higher than or equal to the phase voltage of the other normal phase B within the "allowable range" is identified as an "allowable range (A)", and an electric angle range in which the phase voltage of the other normal phase B is higher than the phase voltage of the one normal phase A is identified as an "allowable range (B)". In the above example, a range in which the U-phase induced voltage $V_U'$ is higher than or equal to the W-phase induced voltage $V_W'$ within the "allowable range" (in this example, a range of 210° to 270°) is identified as an "allowable range (U)", and a range in which the W-phase induced voltage $V_W'$ is higher than the U-phase induced voltage $V_U'$ (in this example, a range of 150° to 210°) is identified as an "allowable range (W)".

In addition, an electric angle range in which the induced voltages $V_U'$ and $V_W'$ of respective normal phases (U phase and V phase) are lower than or equal to the induced voltage $V_V'$ of the short-circuit phase (V phase) (an electric angle range in which load current does not flow through either the first closed circuit 61 or the second closed circuit 62 in FIG. 4) is identified as a "non-allowable range". In this example, the "non-allowable range" is a range of 330° to 90°. An electric angle range intermediate between the "allowable range" and the "non-allowable range" (an electric angle range in which load current flows through only one of the first and second closed circuits 61 and 62 in FIG. 4) is identified as an "indeterminate range". In this example, the "indeterminate range" includes a range of 90° to 150° and a range of 270° to 330°.

Note that, in the present embodiment, in the case where the short-circuited FET is the low-side FET, if two normal phases are denoted by A and B and the short-circuit phase is denoted by C, an electric angle range in which the phase voltage of one normal phase A is higher than the phase voltage of the short-circuit phase C within the "indeterminate range" is identified as an "indeterminate range (A)", and an electric angle range in which the phase voltage of the other normal phase B is higher than the phase voltage of the short-circuit phase C is identified as an "indeterminate range (B)". In the above example, an electric angle range in which the U-phase induced voltage $V_U'$ is higher than the short-circuit phase (V-phase) induced voltage $V_V'$ within the "indeterminate range" (a range of 270° to 330°) is identified as an "indeterminate range (U)", and an electric angle in which the W-phase induced voltage $V_W'$ is higher than the short-circuit phase (V-phase) induced voltage $V_V'$ (a range of 90° to 150°) is identified as an "indeterminate range (W)".

Figure 8B:
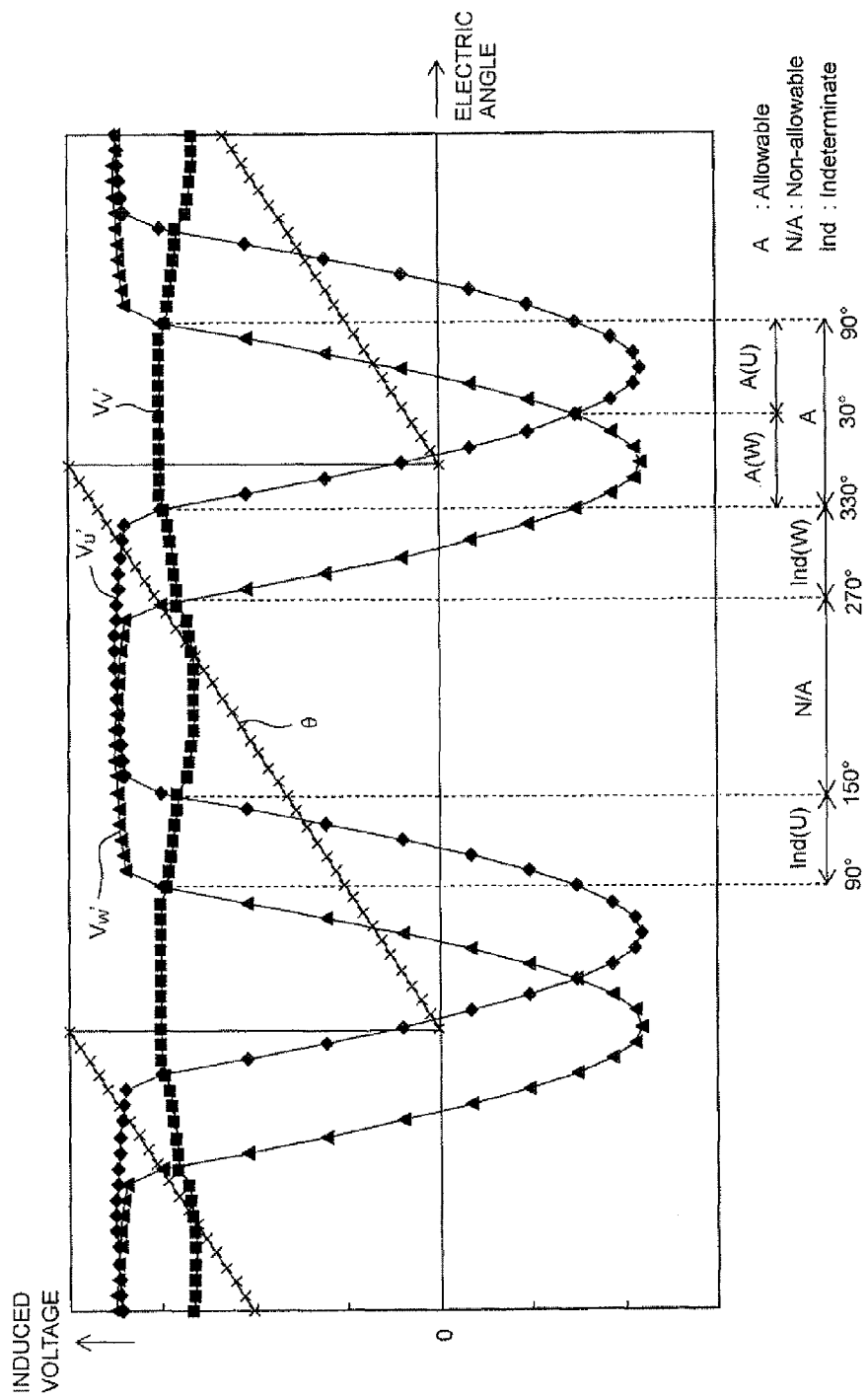
FIG. 8B is a graph that shows theoretical values of respective phase induced voltage waveforms $V_U'$, $V_V'$ and $V_W'$ with respect to a rotor rotation angle θ when the rotor is rotated in the forward direction in a state where all the FETs other than the V-phase high-side FET are turned off when a short-circuit fault occurs in the V-phase high-side FET.

FIG. 8B is a graph that shows theoretical values (simulation values) of respective phase induced voltage waveforms $V_U'$, $V_V'$ and $V_W'$ with respect to a rotor rotation angle θ when the rotor is rotated in the forward direction in a state where all the FETs other than the V-phase high-side FET $31_{VH}$ are turned off when a short-circuit fault occurs in the V-phase high-side FET $31_{VH}$. On the basis of the theoretical values shown in FIG. 8B, the controllable range in the case where the short-circuited FET is the V-phase high-side FET $31_{VH}$ and the direction in which the electric motor 18 should be rotated is the forward direction is identified.

Specifically, an electric angle range in which the induced voltages $V_U'$ and $V_W'$ of respective normal phases (U phase and V phase) are lower than the induced voltage $V_V'$ of the short-circuit phase (V phase) (an electric angle range in which load current does not flow through either the third closed circuit 63 or the fourth closed circuit 64 in FIG. 5) is identified as the "allowable range". In this example, the "allowable range" is a range of 330° to 90°. Note that, in the present embodiment, in the case where the short-circuited FET is the high-side FET, if two normal phases are denoted by A and B, an electric angle range in which the phase voltage of one normal phase A is lower than or equal to the phase voltage of the other normal phase B within the "allowable range" is identified as an "allowable range (A)", and an electric angle range in which the phase voltage of the other normal phase B is lower than the phase voltage of the one normal phase A is identified as an "allowable range (B)". In the above example, a range in which the U-phase induced voltage $V_U'$ is lower than or equal to the W-phase induced voltage $V_W'$ within the "allowable range" (in this example, a range of 30° to 90°) is identified as an "allowable range (U)", and a range in which the W-phase induced voltage $V_W'$ is lower than the U-phase induced voltage $V_U'$ (in this example, a range of 330° to 30°) is identified as an "allowable range (W)".

In addition, an electric angle range in which the induced voltages $V_U'$ and $V_W'$ of respective normal phases (U phase and V phase) are higher than or equal to the induced voltage $V_V'$ of the short-circuit phase (V phase) (an electric angle range in which load current flows through both the third closed circuit 63 and the fourth closed circuit 64 in FIG. 5) is identified as the "non-allowable range". In this example, the "non-allowable range" is a range of 150° to 270°. Then, an electric angle range intermediate between the "allowable range" and the "non-allowable range" (an electric angle range in which load current flows through only one of the third closed circuit 63 and the fourth closed circuit 64 in FIG. 5) is identified as an "indeterminate range". In this example, the "indeterminate range" includes a range of 90° to 150° and a range of 270° to 330°.

Note that, in the present embodiment, in the case where the short-circuited FET is the high-side FET, if two normal phases are denoted by A and B and the short-circuit phase is denoted by C, an electric angle range in which the phase voltage of one normal phase A is lower than the phase voltage of the short-circuit phase C within the "indeterminate range" is identified as an "indeterminate range (A)", and an electric angle range in which the phase voltage of the other normal phase B is lower than the phase voltage of the short-circuit phase C is identified as an "indeterminate range (B)". In the above example, an electric angle in which the U-phase induced voltage $V_U'$ is lower than the short-circuit phase (V-phase) induced voltage $V_V'$ (range of 90° to 150°) within the "indeterminate range" is obtained as an "indeterminate range (U)", and an electric angle range in which the W-phase induced voltage $V_W'$ is lower than the short-circuit phase (V-phase) induced voltage $V_V'$ (range of 270° to 330°) is obtained as an "indeterminate range (W)".

Similarly, the respective ranges in the case where the direction in which the electric motor 18 should be rotated is the forward direction and the short-circuited FET is the U-phase low-side FET 31$_{UL}$, the respective ranges in the case where the direction in which the electric motor 18 should be rotated is the forward direction and the short-circuited FET is the U-phase high-side FET 31$_{UH}$, the respective ranges in the case where the direction in which the electric motor 18 should be rotated is the forward direction and the short-circuited FET is the W-phase low-side FET 31$_{WL}$ and the respective ranges in the case where the direction in which the electric motor 18 should be rotated is the forward direction and the short-circuited FET is the W-phase low-side FET 31$_{WL}$ are obtained. On the basis of the thus obtained ranges, a map in the case where the direction in which the electric motor 18 should be rotated is the forward direction is created in advance. In addition, in a similar method, a map in the case where the direction in which the electric motor 18 should be rotated is the reverse direction (CCW) is created in advance. Thus, the map shown in FIG. 6 is obtained.

Figure 9:
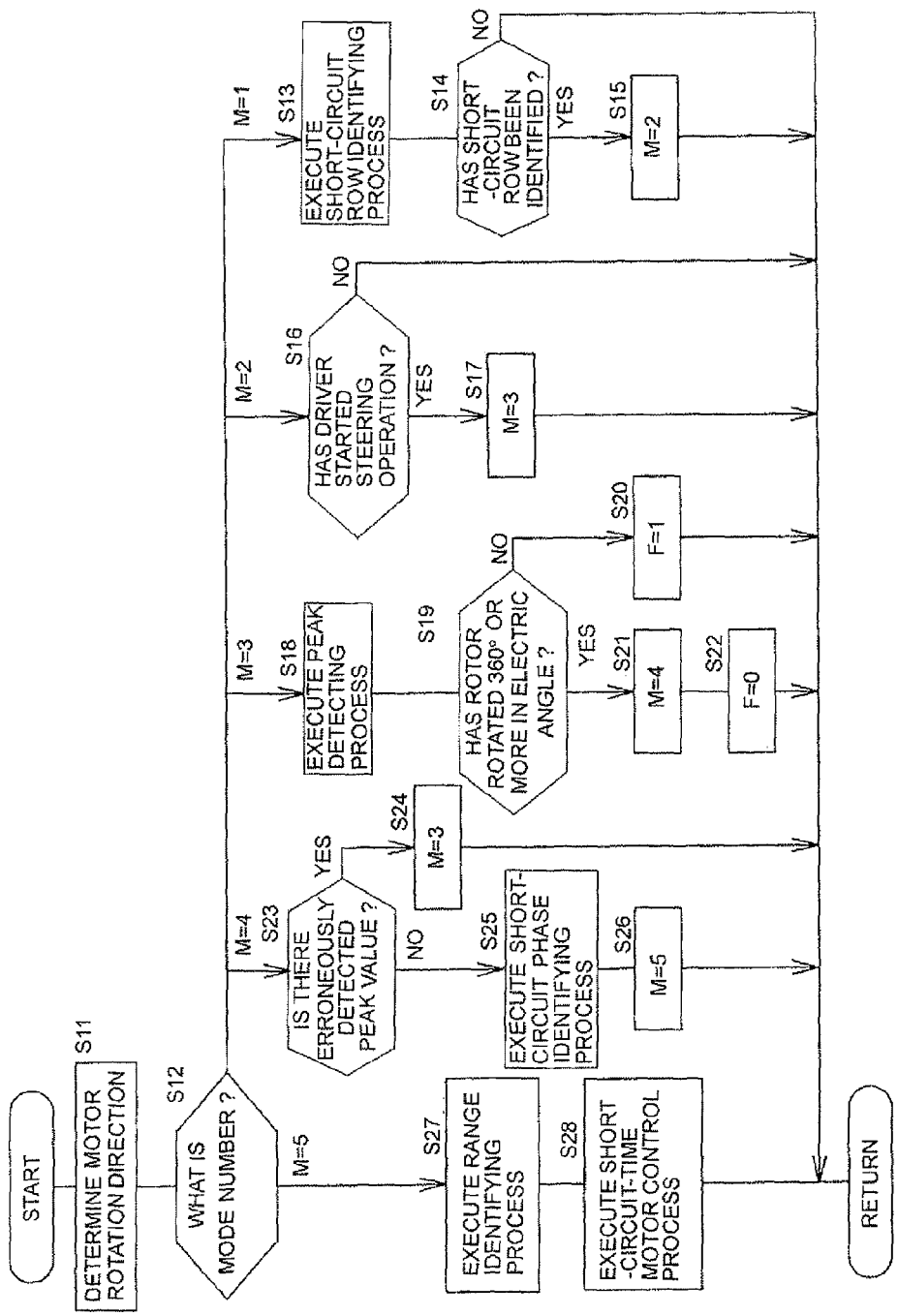
FIG. 9 is a flowchart that shows the detailed procedure of abnormal-time control process in step S5 of FIG. 3.

FIG. 9 is a flowchart that shows the detailed procedure of the abnormal-time control process in step S5 of FIG. 3. The process of FIG. 9 is repeatedly executed at predetermined computation cycles. In the abnormal-time control process, a variable M for storing a mode number (hereinafter, referred to as "mode number M") and a flag F that is referenced in peak detecting process (described later) (see step S18) are used. In initial settings at the time of power-on, the mode number M is set at 1, and the flag F is reset to zero.

In the abnormal-time control process, the control unit 40 determines the direction in which the electric motor 18 should be rotated (step S11). The rotation direction in which the electric motor 18 should be rotated is determined on the basis of, for example, a signal output from the torque sensor 11. Specifically, the direction in which the electric motor 18 should be rotated is determined on the basis of whether the signal output from the torque sensor 11 indicates a clockwise steering torque or a counterclockwise steering torque. That is, when the signal output from the torque sensor 11 indicates a clockwise steering torque, the rotation direction for generating torque that assists steering to the right is determined as the rotation direction in which the electric motor 18 should be rotated. On the other hand, when the signal output from the torque sensor 11 indicates a counterclockwise steering torque, the rotation direction for generating torque that assists steering to the left is determined as the rotation direction in which the electric motor 18 should be rotated.

Subsequently, the control unit 40 determines the mode number M (step S12). Because the initial value of the mode number M is 1, when the current computation cycle is the first computation cycle after the abnormal-time control process is started, the control unit 40 determines that the mode number M is 1. Therefore, the control unit 40 proceeds to step S13, and executes faulty row identifying process. In the faulty row identifying process, the control unit 40 determines whether a short-circuit fault has occurred in one of the FETs and, when a short-circuit fault has occurred, identifies whether the short-circuited FET is a high-side FET or a low-side FET.

Specifically, the control unit 40 acquires the phase voltages $V_U$, $V_V$ and $V_W$ of the respective phases. Then, the control unit 40 checks whether a first condition that one of the phase voltages is lower than or equal to a predetermined ground level VG (first threshold; for example, 0.5 [V]) is satisfied and whether a second condition that one of the phase voltages is higher than or equal to a predetermined power supply level VB (second threshold; for example, 5.0 [V]) is satisfied. When the first condition is satisfied, the control unit 40 determines that a short-circuit fault has occurred in the low-side FET of one of the phases. When the second condition is satisfied, the control unit 40 determines that a short-circuit fault has occurred in the high-side FET of one of the phases. When neither the first condition nor the second condition is satisfied, the control unit 40 determines that no short-circuit fault has occurred.

When it has been identified through the faulty row identifying process whether the short-circuited FET is a high-side FET or a low-side FET (YES in step S14), the control unit 40 updates the mode number M to 2 (step S15). Then, the process in the current computation cycle ends. When it has not been identified through the faulty row identifying process whether the short-circuited FET is the high-side FET or the low-side FET (NO in step S14), the control unit 40 ends the current computation cycle. In this case, the mode number M remains at 1, and, in the next computation cycle as well, the faulty row identifying process in step S13 is executed after the process in step S11 is executed.

In step S12, when it is determined that the mode number M is 2, the control unit 40 proceeds to step S16, and determines whether the driver has started a steering operation. That is, the control unit 40 determines whether the driver has started operating the steering wheel 2. Specifically, the control unit 40 determines that the driver has started a steering operation when the rotor rotation angle detected by the rotation angle sensor 52 is changed.

When it is determined that the driver has started steering operation (YES in step S16), the control unit 40 updates the mode number M to 3 (step S17). Then, the process in the current computation cycle ends. When it is determined that the driver has not started steering operation (NO in step S16), the control unit 40 ends the process in the current computation cycle. In this case, because the mode number M remains at 2, in the subsequent computation cycle as well, it is determined whether steering operation has been started after the process in step S11.

When it is determined in step S12 that the mode number M is 3, the control unit 40 proceeds to step S18, and executes peak detecting process. The peak detecting process is executed to identify the phase of the short-circuited FET (short-circuit phase) in step S25 (described later). The concept of a method of identifying a short-circuit phase will be described. After the driver has started a steering operation, the phase voltages (induced voltages) of the respective phases are monitored. After the rotor of the electric motor 18 rotates 360° or more in electric angle, the phase with the smallest phase voltage change is the short-circuit phase. This is because the amount of generated induced voltage is small in the short-circuit phase.

When the short-circuited FET is a low-side FET, the phase voltage of the short-circuit phase is kept at a value close to the ground potential. Therefore, when the rotor rotates 360° or more in electric angle, the maximum phase voltage of the short-circuit phase is lower than the maximum phase voltage of each normal phase. Therefore, when the rotor rotates 360° or more in electric angle, the control unit 40 compares the maximum phase voltages of the respective phases with one another and identifies the phase with the smallest the maximum phase voltage as the short-circuit phase.

On the other hand, when the short-circuited FET is a high-side FET, the phase voltage of the short-circuit phase is kept at a value close to the power supply voltage. Therefore, when the rotor rotates 360° or more in electric angle, the minimum phase voltage of the short-circuit phase is higher than the minimum phase voltage of each normal phase. Therefore, when the rotor rotates 360° or more in electric angle, the control unit 40 compares the minimum phase voltages of the respective phases with one another and identifies the phase with the largest minimum phase voltage as the short-circuit phase.

In the peak detecting process in step S18, when the short-circuited FET is identified as a low-side FET, the process for detecting the maximum phase voltages of the respective phases is executed. On the other hand, when the short-circuited FET is identified as a high-side FET, the process for detecting the minimum phase voltages of the respective phases is executed in the peak detecting process. As shown in FIG. 10, the memory of the control unit 40 has an area e1, an area e2, an area e3, an area e4, an area e5 and an area e6. The area e1 stores a U-phase peak value candidate $V_{UP}$. The area e2 stores a rotor rotation angle $\theta_U$ when the U-phase peak value candidate $V_{UP}$ stored in the area e1 is detected. The area e3 stores a V-phase peak value candidate $V_{VP}$. The area e4 stores a rotor rotation angle $\theta_V$ when the V-phase peak value candidate $V_{VP}$ stored in the area e3 is detected. The area e5 stores a W-phase peak value candidate $V_{WP}$. The area e6 stores a rotor rotation angle $\theta_W$ when the W-phase peak value candidate $V_{WP}$ stored in the area e5 is detected.

Note that the peak value candidates $V_{UP}$, $V_{VP}$ and $V_{WP}$ become corresponding maximum phase voltage candidates when the short-circuited FET is identified as a low-side FET, and become corresponding minimum phase voltage candidates when the short-circuited FET is identified as a high-side FET. In the following description, the case where the short-circuited FET is identified as a low-side FET will be described.

Referring back to FIG. 9, in step S18, the control unit 40 initially acquires the rotor rotation angle (electric angle) detected by the rotation angle sensor 52 and acquires the phase voltages $V_U$, $V_V$ and $V_W$ of the respective phases. Then, it is determined whether the flag F has been reset to zero (F=0). The flag F is reset to zero in the initial state. As will be described later, the flag F is set (F=1) after the peak detecting process is executed (see step S20). Then, as will be described later, when it is determined that the rotor is rotated 360° or more from when the peak detecting process is started, the flag F is reset to zero (F=0) (see step S22).

When the flag F has been reset to zero, the control unit 40 determines that the present time is the timing at which the peak detecting process is started, and stores the currently acquired U-phase phase voltage $V_U$ in the area e1 of the memory as the U-phase maximum phase voltage candidate $V_{UP}$. In addition, the control unit 40 stores the currently acquired V-phase phase voltage $V_V$ in the area e3 of the memory as the V-phase maximum phase voltage candidate $V_{VP}$. In addition, the control unit 40 stores the currently acquired W-phase phase voltage $V_W$ in the area e5 of the memory as the W-phase maximum phase voltage candidate $V_{WP}$. In addition, the control unit 40 stores the currently acquired rotor rotation angles in the areas e2, e4 and e6 of the memory as rotor rotation angles $\theta_U$, $\theta_V$ and $\theta_W$ at the time when the U-phase, V-phase and W-phase maximum phase voltage candidates are detected, respectively.

On the other hand, when the flag F is set (F=1), the control unit 40 determines that the peak detecting process is executed for the second time or subsequent times after the peak detecting process is started. In this case, the control unit 40 executes the following process on the basis of the currently acquired phase voltages $V_U$, $V_V$ and $V_W$ of the respective phases and the corresponding maximum phase voltage candidates $V_{UP}$, $V_{VP}$ and $V_{WP}$ stored in the areas e1, e3 and e5 of the memory, respectively.

The control unit 40 compares the currently acquired U-phase phase voltage $V_U$ with the U-phase maximum phase voltage candidate $V_{UP}$ stored in the area e1 of the memory. When the currently acquired U-phase phase voltage $V_U$ is higher than the U-phase maximum phase voltage candidate $V_{UP}$, the control unit 40 stores the currently acquired U-phase phase voltage $V_U$ in the area e1 of the memory as the U-phase maximum phase voltage candidate $V_{UP}$, and stores the currently acquired rotor rotation angle in the area e2 of the memory as the rotor rotation angle $\theta_U$ at the time when the U-phase maximum phase voltage candidate is detected. That is, the control unit 40 updates the U-phase maximum phase voltage candidate $V_{UP}$ in the area e1 and the rotor rotation angle $\theta_U$ in the area e2. On the other hand, when the currently acquired U-phase phase voltage $V_U$ is lower than or equal to the U-phase maximum phase voltage candidate $V_{UP}$ stored in the area e1, the control unit 40 updates neither the U-phase maximum phase voltage candidate $V_{UP}$ in the area e1 nor the rotor rotation angle $\theta_U$ in the area e2.

Similarly, the control unit 40 compares the currently acquired V-phase phase voltage $V_V$ with the V-phase maximum phase voltage candidate $V_{VP}$ stored in the area e3 of the memory. When the currently acquired V-phase phase voltage $V_V$ is higher than the V-phase maximum phase voltage candidate $V_{VP}$, the control unit 40 stores the currently acquired V-phase phase voltage $V_V$ in the area e3 of the memory as the V-phase maximum phase voltage candidate $V_{VP}$, and stores the currently acquired rotor rotation angle in the area e4 of the memory as the rotor rotation angle $\theta_V$ at the time when the V-phase maximum phase voltage candidate is detected. That is, the control unit 40 updates the V-phase maximum phase voltage candidate $V_{VP}$ in the area e3 and the rotor rotation angle $\theta_V$ in the area e4. On the other hand, when the currently acquired V-phase phase voltage $V_V$ is lower than or equal to the V-phase maximum phase voltage candidate $V_{VP}$ stored in the area e3, the control unit 40 updates neither the V-phase maximum phase voltage candidate $V_{VP}$ in the area e3 nor the rotor rotation angle $\theta_V$ in the area e4.

Similarly, the control unit 40 compares the currently acquired W-phase phase voltage $V_W$ with the W-phase maximum phase voltage candidate $V_{WP}$ stored in the area e5 of the memory. When the currently acquired W-phase phase voltage $V_W$ is higher than the W-phase maximum phase voltage candidate $V_{WP}$, the control unit 40 stores the currently acquired W-phase phase voltage $V_W$ in the area e5 of the memory as the W-phase maximum phase voltage candidate $V_{WP}$, and stores the currently acquired rotor rotation angle in the area e6 of the memory as the rotor rotation angle $\theta_W$ at the time when the W-phase maximum phase voltage candidate is detected. That is, the control unit 40 updates the W-phase maximum phase voltage candidate $V_{WP}$ in the area e5 and the rotor rotation angle $\theta_W$ in the area e6. On the other hand, when the currently acquired W-phase phase voltage $V_W$ is lower than or equal to the W-phase maximum phase voltage candidate $V_{WP}$ stored in the area e5, the control unit 40 updates neither the W-phase maximum phase voltage candidate $V_{WP}$ in the area e5 nor the rotor rotation angle $\theta_W$ in the area e6.

Note that, when the short-circuited FET is a high-side FET, the U-phase minimum phase voltage candidate is stored in the area e1 of the memory. In this case, only when the currently acquired U-phase phase voltage $V_U$ is lower than the U-phase minimum phase voltage candidate stored in the area e1 of the memory, the U-phase minimum phase voltage candidate in the area e1 of the memory and the rotor rotation angle in the area e2 of the memory are updated. This also applies to the other phases (V phase and W phase).

When the above peak detecting process has been executed, the control unit 40 proceeds to step S19. In step S19, the control unit 40 determines whether the rotor of the electric motor 18 has rotated 360° or more in electric angle after the peak detecting process is started. For example, when the difference between the current rotor rotation angle acquired in step S18 and the immediately preceding rotor rotation angle is a rotor angle change amount, the control unit 40 computes an accumulated value of the rotor angle change amount from when the peak detecting process is started up to the present time and then determines whether the absolute value of the accumulated value of the rotor angle change amount is larger than or equal to 360°. Thus, the control unit 40 determines whether the rotor has rotated 360° or more in electric angle.

When it is determined that the rotor has not rotated 360° or more in electric angle after the peak detecting process is started (NO in step S19), the flag F is set (F=1) (step S20). Then, the process in the current computation cycle ends. In this case, because the mode number M remains at 3, in the next computation cycle as well, the peak detecting process in step S18 is executed after the process in step S11 is executed.

On the other hand, when it is determined in step S19 that the rotor has rotated 360° or more in electric angle after the peak detecting process is started (YES in step S19), the control unit 40 updates the mode number M to 4 (step S21), and resets the flag F to zero (F=0) (step S22). Then, the process in the current computation cycle ends. When it is determined in step S12 that the mode number M is 4, the control unit 40 proceeds to step S23, and determines whether there is an erroneously detected peak value. The phases of the induced voltages of the respective phases are shifted by 120° from each other, so the rotor rotation angles at the time when the phase voltages of the respective phases are peak values (maximum values or minimum values) should be different from one another. Then, it is determined whether, among all the combinations each of which is formed of two rotation angles selected from the three rotor rotation angles stored in the areas e2, e4 and e6, that is, among $(\theta_U, \theta_V)$, $(\theta_V, \theta_W)$ or $(\theta_W, \theta_U)$, there is a combination formed of two rotation angles having a difference of which the absolute value is smaller than or equal to a predetermined angle (for example, 1°). The control unit 40 determines that there is an erroneously detected peak value, if there is a combination formed of two rotation angles having a difference of which the absolute value is smaller than or equal to the predetermined angle, among all the combinations. On the other hand, the control unit 40 determines that there is no erroneously detected peak value, if there is no combination formed of two rotation angles having a difference of which the absolute value is smaller than or equal to the predetermined angle, among all the combinations.

When it is determined that there is an erroneously detected peak value (YES in step S23), the control unit 40 updates the mode number M to 3 (step S24). Then, the process in the current computation cycle ends. In this case, in the next computation cycle, the peak detecting process in step S18 is executed after the process in step S11 is executed. However, in this case, because the flag F is reset to zero (F=0) (see step S22), the control unit 40 executes the peak detecting process again from the beginning.

When it is determined in step S23 that there is no erroneously detected peak value (NO in step S23), the control unit 40 executes short-circuit phase identifying process (step S25). Specifically, the control unit 40 identifies the phase corresponding to the smallest one of the maximum phase voltage candidates $V_{UP}$, $V_{VP}$ and $V_{WP}$ respectively stored in the areas e1, e3 and e5 of the memory, as a short-circuit phase. Note that, when the short-circuited FET is a high-side FET, the control unit 40 identifies the phase corresponding to the largest one of the minimum phase voltage candidates respectively stored in the areas e1, e3 and e5 of the memory, as a short-circuit phase. When the short-circuit phase is identified in this way, the position of the one short-circuited FET is identified.

When the short-circuit phase identifying process ends, the control unit 40 updates the mode number M to 5 (step S26). Then, the process in the current computation cycle ends. In step S12, when it is determined that the mode number M is 5, the control unit 40 executes range identifying process (step S27). Specifically, the control unit 40 acquires the rotor rotation angle (electric angle) detected by the rotation angle sensor 52. Then, the control unit 40 identifies the ranges ("allowable range", "indeterminate range" and "non-allowable range") corresponding to the direction in which the electric motor 18 should be rotated and the position of the one short-circuited FET on the basis of the direction (CW or CCW) in which the electric motor 18 should be rotated, determined in step S11 in the current computation cycle, the position of the one short-circuited FET and the map shown in FIG. 6. Then, the control unit 40 determines which one of the "allowable range", "indeterminate range" and "non-allowable range" the currently acquired rotor rotation angle (current rotor rotation angle) belongs to.

Subsequently, the control unit 40 executes short-circuit-time motor control process (step S28), and then ends the process in the current computation cycle. In the short-circuit-time motor control process, the control unit 40 controls the drive circuit 30 on the basis of the range to which the current rotor rotation angle belongs ("allowable range", "indeterminate range" or "non-allowable range"). When the current rotor rotation angle belongs to the "non-allowable range", the control unit 40 turns off all the FETs 32. That is, in this case, the electric motor 18 is not driven.

On the other hand, when the current rotor rotation angle belongs to the "allowable range" or when the current rotor rotation angle belongs to the "indeterminate range, the control unit 40 controls the drive circuit 30 to drive the electric motor 18. Specifically, the control unit 40 drives the electric motor 18, for example, in the 120° rectangular wave drive mode. Hereinafter, the case where the electric motor 18 is driven in a 120° rectangular wave drive mode when the current electric angle belongs to the "allowable range" or the "indeterminate range" will be described.

Figure 11:
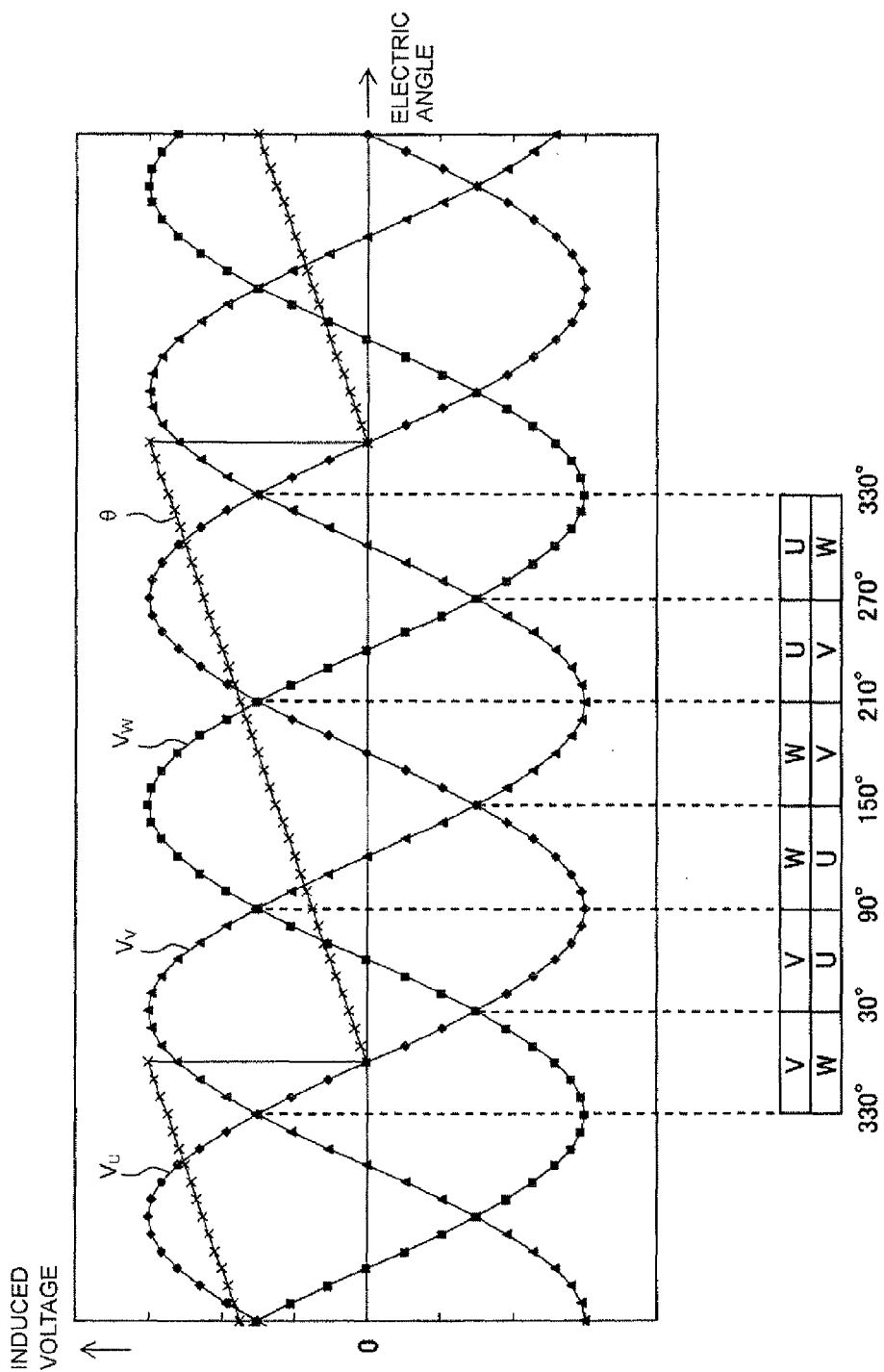
FIG. 11 is a view that illustrates the timing at which each FET is turned on in the case where the electric motor is rotated in the forward direction in a 120° rectangular wave drive mode.

FIG. 11 is a view illustrating the timing at which each FET 31 is turned on in the case where the electric motor 18 is rotated in the forward direction in the 120° rectangular wave drive mode. FIG. 11 shows the respective phase induced voltage waveforms $V_U$, $V_V$ and $V_W$ with respect to a rotor rotation angle θ at the time when the electric motor 18 is driven in the 180° sinusoidal wave energization drive mode in the case where all the FETs 31 are normal, and shows the on/off pattern (energization pattern) of the FETs 31 with respect to a rotor rotation angle θ at the time when the electric motor 18 is rotated in the forward direction in the 120° rectangular wave drive mode in the case where all the FETs 31 are normal.

In the 120° rectangular wave drive mode, each time the rotor is rotated 60° in electric angle, the combination of the FETs that are turned on is changed. The energization pattern shows the FETs that are turned on in each electric angle range at intervals of 60°. The upper side of each electric angle range shows the phase (U, V or W) of the high-side FET that is turned on, and the lower side of each electric angle range shows the phase of the low-side FET that is turned on.

According to the energization pattern, when the electric motor 18 is driven in the forward direction in the 120° rectangular wave drive mode in the case where all the FETs 31 are normal, the relationship between the electric angle range at intervals of 60° and the FETs 31 that are turned on is as follows.

330° to 30°: the V-phase high-side FET $31_{VH}$ and the W-phase low-side FET $31_{WL}$
30° to 90°: the V-phase high-side FET $31_{VH}$ and the U-phase low-side FET $31_{UL}$
90° to 150°: the W-phase high-side FET $31_{WH}$ and the U-phase low-side FET $31_{UL}$
150° to 210°: the W-phase high-side FET $31_{WH}$ and the V-phase low-side FET $31_{VL}$
210° to 270°: the U-phase high-side FET $31_{UH}$ and the V-phase low-side FET $31_{VL}$
270° to 330°: the U-phase high-side FET $31_{UH}$ and the W-phase low-side FET $31_{WL}$ In the case where a short-circuit fault occurs in one of the six FETs 31, when the current electric angle falls within the "allowable range" or the "indeterminate range", the control unit 40 turns on the two FETs that should be turned on at the current electric angle in the energization pattern. For example, in the case where the short-circuited FET is the V-phase low-side FET $31_{VL}$, when the rotation direction in which the electric motor 18 should be rotated is the forward direction, the "allowable range", the "indeterminate range" and the "non-allowable range" are as follows.

"Allowable range (U)": 210° to 270°
"Allowable range (W)": 150° to 210°
"Indeterminate range (U)": 270° to 330°
"Indeterminate range (W)": 90° to 150°
"Non-allowable range": 330° to 90°

Therefore, when the current electric angle belongs to the electric angle range of 330° to 90° that is the "non-allowable range", the control unit 40 turns off all the FETs other than the short-circuited FET. In this case, the electric motor 18 is not driven.

When the current electric angle belongs to the electric angle range of 90° to 150° that is the "indeterminate range (W)", the control unit 40 turns on the W-phase high-side FET $31_{WH}$ and the U-phase low-side FET $31_{UL}$ in accordance with the energization pattern of FIG. 11. In this case, as shown in FIG. 2 or FIG. 4, current that flows from the power supply 33 through the W-phase high-side FET $31_{WH}$ passes through the electric motor 18 (field coils 18W, 18U and 18V) and then flows to the ground 34 via the U-phase low-side FET $31_{UL}$ and the V-phase low-side FET (short-circuited FET) $31_{VL}$. Thus, the electric motor 18 is driven to generate assist force.

When the current electric angle belongs to the electric angle range of 150° to 210° that is the "allowable range (W)", the control unit 40 turns on the W-phase high-side FET $31_{WH}$ and the V-phase low-side FET (short-circuited FET) $31_{VL}$ in accordance with the energization pattern of FIG. 11. In this case, current that flows from the power supply 33 through the W-phase high-side FET $31_{WH}$ passes through the electric motor 18 (field coils 18W and 18V) and then flows to the ground 34 via the V-phase low-side FET (short-circuited FET) $31_{VL}$. Thus, the electric motor 18 is driven to generate assist force.

When the current electric angle belongs to the electric angle range of 210° to 270° that is the "allowable range (U)", the control unit 40 turns on the U-phase high-side FET $31_{UH}$ and the V-phase low-side FET (short-circuited FET) $31_{VL}$ in accordance with the energization pattern of FIG. 11. In this case, current that flows from the power supply 33 through the U-phase high-side FET $31_{UH}$ passes through the electric motor 18 (field coils 18U and 18V) and then flows to the ground 34 via the V-phase low-side FET (short-circuited FET) $31_{VL}$. Thus, the electric motor 18 is driven to generate assist force.

When the current electric angle belongs to the electric angle range of 270° to 330° that is the "indeterminate range (U)", the control unit 40 turns on the U-phase high-side FET $31_{UH}$ and the W-phase low-side FET $31_{WL}$ in accordance with the energization pattern of FIG. 11. In this case, current that flows from the power supply 33 through the U-phase high-side FET $31_{UH}$ passes through the electric motor 18 (field coils 18U, 18W and 18V) and then flows to the ground 34 via the W-phase low-side FET $31_{WL}$ and the V-phase low-side FET (short-circuited FET) $31_{VL}$.

On the other hand, in the case where the short-circuited FET is the V-phase high-side FET $31_{VH}$, when the direction in which the electric motor 18 should be rotated is the forward direction, the "allowable range", the "indeterminate range" and the "non-allowable range" are as follows.

"Allowable range (W)": 330° to 30°
"Allowable range (U)": 30° to 90°
"Indeterminate range (U)": 90° to 150°
"Indeterminate range (W)": 270° to 330°
"Non-allowable range": 150° to 270°

Therefore, when the current electric angle belongs to the electric angle range of 330° to 30° that is the "allowable range (W)", the control unit 40 turns on the V-phase high-side FET (short-circuited FET) $31_{VH}$ and the W-phase low-side FET $31_{WL}$ in accordance with the energization pattern of FIG. 11. In this case, as shown in FIG. 2 or FIG. 4, current that flows from the power supply 33 through the V-phase high-side FET (short-circuited FET) $31_{VH}$ passes through the electric motor 18 (field coils 18V and 18W) and then flows to the ground 34 via the W-phase low-side FET $31_{WL}$.

When the current electric angle belongs to the electric angle range of 30° to 90° that is the "allowable range (U)", the control unit 40 turns on the V-phase high-side FET (short-circuited FET) $31_{VH}$ and the U-phase low-side FET $31_{UL}$ in accordance with the energization pattern of FIG. 11. In this case, current that flows from the power supply 33 through the V-phase high-side FET (short-circuited FET) $31_{VH}$ passes through the electric motor 18 (field coils 18V and 18U) and then flows to the ground 34 via the W-phase low-side FET $31_{UL}$.

When the current electric angle belongs to the electric angle range of 90° to 150° that is the "indeterminate range (U)", the control unit 40 turns on the W-phase high-side FET $31_{WH}$ and the U-phase low-side FET $31_{UL}$ in accordance with the energization pattern of FIG. 11. In this case, current supplied from the power supply 33 to the W-phase high-side FET $31_{WH}$ passes through the electric motor 18 (field coils 18W and 18U) and flows to the ground 34 via the U-phase low-side FET $31_{UL}$, and current supplied from the power supply 33 to the V-phase high-side FET (short-circuited FET) $31_{VH}$ passes through the electric motor 18 (field coils 18V and 18U) and then flows to the ground 34 via the U-phase low-side FET $31_{UL}$.

When the current electric angle belongs to the electric angle range of 150° to 270° that is the "non-allowable range", the control unit 40 turns off all the FETs other than the short-circuited FET. When the current electric angle belongs to the electric angle range of 270° to 330° that is the "indeterminate range (W)", the control unit turns on the U-phase high-side FET 31 UH and the W-phase low-side FET $31_{WL}$ in accordance with the energization pattern of FIG. 11. In this case, current supplied from the power supply 33 to the U-phase high-side FET $31_{UH}$ passes through the electric motor 18 (field coils 18U and 18W) and then flows to the ground 34 via the W-phase low-side FET $31_{WL}$, and current supplied from the power supply 33 through the V-phase high-side FET (short-circuited FET) $31_{VH}$ passes through the electric motor 18 (field coils 18V and 18W) and then flows to the ground 34 via the W-phase low-side FET $31_{WL}$.

Note that, when the direction in which the electric motor 18 should be rotated is the reverse direction, the electric motor 18 is subjected to drive control as follows. That is, when the current electric angle belongs to the "non-allowable range", the control unit 40 turns off all the FETs 31 other than the short-circuited FET. On the other hand, when the current electric angle belongs to the "allowable range" or the "indeterminate range", the control unit 40 turns on the two FETs that should be turned on with respect to the current electric angle when the electric motor 18 is rotated in the reverse direction in a 120° rectangular wave drive mode in the case where all the FETs are normal.

According to the above embodiment, when a short-circuit fault occurs in one of the six FETs 31 in the drive circuit 30, it is possible to identify the short-circuited FET. According to the above embodiment, a short-circuit phase is identified by utilizing induced voltages generated from the electric motor 18 through a driver's operation of the steering wheel 2. Therefore, in order to identify the short-circuit phase, it is not necessary to forcibly pass current through the electric motor 18. In addition, when the rotor rotates about 360° in electric angle through a driver's steering operation, the short-circuit phase is identified. Therefore, it is possible to identify the short-circuited FET in a relatively short period of time.

In addition, according to the above embodiment, it is determined whether there is an erroneously detected peak value on the basis of the rotor rotation angle when the peak values of the phase voltages of the respective phases are respectively detected. If there is an erroneously detected peak value, the peak value detecting process is executed again from the beginning. Therefore, it is possible to improve the accuracy of identifying the short-circuit phase. In addition, according to the above embodiment, when a short-circuit fault occurs in one of the six FETs 31 in the drive circuit 30, the electric angle range (rotor rotation angle range) in which the electric motor 18 is driven is identified as the controllable range on the basis of the direction in which the electric motor 18 should be rotated. Thus, it is possible to determine whether the current electric angle belongs to the controllable range. If the current electric angle belongs to the controllable range, the electric motor 18 is driven. As a result, even if a short-circuit fault occurs in one FET, the electric motor 18 is able to assist the driver in steering operation.

Note that, various design changes may be made to the above-described embodiment.

What is claimed is:

1. A vehicle steering system that applies driving force to a steering mechanism of a vehicle with use of a three-phase brushless motor that has a rotor and field coils, comprising:
   a drive circuit that includes three sets of series circuits which correspond to the respective three phases and each of which is formed of two switching elements that are connected in series, wherein the series circuits are connected in parallel with one another between a power supply and a ground, and regenerative diodes are connected in parallel with the respective switching elements;
   stop control means for, when a short-circuit fault occurs in one of the plurality of switching elements, turning off all the switching elements to stop driving of the three-phase brushless motor;
   first identifying means for, in a state where driving of the three-phase brushless motor is stopped by the stop control means, identifying whether the short-circuited switching element is one of the high-side switching elements or one of the low-side switching elements;
   second identifying means for, in a case where the short-circuited switching element is identified as one of the high-side switching elements by the first identifying means, detecting minimum phase voltages of the three phases when a steering member for steering the vehicle is operated, and comparing the detected minimum phase voltages of the three phases with one another to identify to which of the three phases the short-circuited switching element corresponds; and
   third identifying means for, in a case where the short-circuited switching element is identified as one of the low-side switching elements by the first identifying means, detecting maximum phase voltages of the three phases when the steering member for steering the vehicle is operated, and comparing the detected maximum phase voltages of the three phases with one another to identify to which of the three phases the short-circuited switching element corresponds.

2. The vehicle steering system according to claim 1, wherein:
   the second identifying means includes minimum erroneous detection check means for determining whether there is an erroneously detected minimum phase voltage based on three rotor rotation angles at which the minimum phase voltages of the respective three phases are detected and for, when it is determined that there is an erroneously detected minimum phase voltage, executing a process for detecting minimum phase voltages of the three phases again; and
   the third identifying means includes maximum erroneous detection check means for determining whether there is an erroneously detected maximum phase voltage based on three rotor rotation angles at which the maximum phase voltages of the respective three phases are detected and for, when it is determined that there is an erroneously detected maximum phase voltage, executing a process for detecting maximum phase voltages of the three phases again.

3. The vehicle steering system according to claim 2, wherein:
   the minimum erroneous detection check means is configured to determine that there is an erroneously detected minimum phase voltage if, among all combinations each of which is formed of two rotor rotation angles selected from the three rotor rotation angles at which the minimum phase voltages of the respective phases are detected, there is a combination formed of two rotor rotation angles having a difference of which an absolute value is smaller than or equal to a predetermined value; and
   the maximum erroneous detection check means is configured to determine that there is an erroneously detected maximum phase voltage if, among all combinations each of which is formed of two rotor rotation angles selected from the three rotor rotation angles at which the maximum phase voltages of the respective phases are detected, there is a combination formed of two rotor rotation angles having a difference of which an absolute value is smaller than or equal to a predetermined value.

* * * * *